Patented Oct. 16, 1934

1,976,716

UNITED STATES PATENT OFFICE

1,976,716

ORGANIC COMPOSITIONS OF MATTER AND USES THEREFOR

Warren A. Custer, Orange, N. J.

No Drawing. Application March 3, 1930,
Serial No. 432,965

12 Claims. (Cl. 87—9)

This invention relates to a new class of organic compositions and their uses in the arts; more specifically it contemplates compositions embodying cellulose esters, soaps or waxes and solvents therefor, which are substantially non-volatile under ordinary conditions. One object of this invention is to provide a class of compositions which may be used advantageously where a liquid or viscous composition is desired that is insoluble in water, stable, inert with respect to atmospheric conditions and of a viscosity which does not vary substantially with changes in temperatures, but which may be increased or decreased to meet the needs of any specific use without otherwise changing the physical properties of the material.

The invention contemplates the provision of a novel class of fluids as an element in hydraulic mechanisms and devices including hydraulic brakes, hydraulic shock absorbers, recoil mechanisms commonly associated with artillery pieces, toys whose driving mechanism operates in contact with a viscous fluid bath, etc.

It is a further object of the invention to provide a novel class of compositions having desirable lubricating properties for mechanical elements, particularly those which are operated at low temperatures.

The invention likewise contemplates a composition of matter which is stable at ordinary temperatures and which is capable of having its properties modified by the addition of various modifying agents.

Many organic esters and ethers are employed in the lacquer art as modifying agents and high boiling solvents for cellulose esters which form the base of the lacquer film. For this purpose several solvents are employed whose boiling points range from a relatively low temperature to a relatively high temperature. The resulting film consists essentially of a large proportion of cellulose ester together with a small proportion of the high boiling solvents. The most satisfactory results are obtained by employing a cellulose ester such as nitro cellulose of low viscosity and an ester having a boiling point which approaches or exceeds 300° C., such as dibutyl phthalate.

According to this invention I dissolve a relatively small amount of the cellulose ester in a solvent such as dibutyl phthalate to produce a composition whose viscosity at any temperature may range from that of the solvent to one which can be moulded and will maintain its form for a comparatively long period of time depending upon the ratio of the ingredients. If desired, modifying agents may be employed for the purpose of imparting any desired characteristics to the product. Thus for example small amounts of soaps may be incorporated in order to reduce the surface tension thereby simulating ordinary greases. If the viscosity of the resulting material is too high it may be reduced advantageously by adding a thinning or blending fluid, preferably one which is compatible with the dibutyl phthalate and the soap if present. For this purpose one may add a high boiling aromatic solvent, or petroleum distillate.

The results of my experiments indicate that a large variety of solvent compositions may be employed with the cellulose ester, thus for example when the cellulose ester employed is nitrocellulose, dibutyl phthalate functions satisfactorily. However, the invention is not limited to the dibutyl derivative but is equally applicable to the use of diethyl phthalate, diamyl phthalate, glycol phthalate, also aromatic phthalates such as dibenzyl phthalate. In lieu of the phthalates one may employ other nitrocellulose solvents which have high boiling points such as the corresponding malate, succinate, or benzoate esters. For some purposes, as when cellulose acetate is employed either alone or with cellulose nitrate, triphenyl and tricresyl phosphates, which have marked solvent properties for the acetate, are employed advantageously. Moreover, the phosphates and thiophosphates possess the desirable quality of imparting non-inflammability to the final product. This property is particularly useful when the lubricating composition is exposed to elevated temperatures.

For the purpose of modifying the viscosity of a composition containing, for example, cellulose nitrate and dibutyl phthalate, xylol or high boiling kerosene fractions may be added to reduce the viscosity or additional cellulose nitrate may be dissolved therein to increase the viscosity.

The amount of soap to be added is governed by the solubility of the soap in the particular cellulose ester solvent. The amount of soap which can be used may be increased by adding a material to the mixture which is compatible with both the soap and the cellulose nitrate. Thus for example aluminum stearate may be employed in increased amounts if a small amount of toluol or xylol be added. Other soaps which may be employed include the palmitates or oleates. In lieu of the aluminum composition, lead, zinc or the alkylamine soaps may be substituted, the latter being readily compatible.

For the purpose of imparting high viscosity, as well as tackiness one may incorporate rosin or related wood products which are soluble. The materials so produced will be found to be substantially non-drying and preserve their tacky characteristic over extended periods of time. For this reason they are well suited for use in the manufacture of fly and insect paper or may be used on the trunks of trees to interrupt the travel of rodents or insects.

There are set forth hereinafter several examples of my invention which it is to be understood are exemplary only.

*Example 1.*—To prepare a composition having a viscosity substantially the same as glycerin or a medium motor oil dissolve in 90/100 parts of dibutyl phthalate 0.9/1.0 parts of "wet" nitrocellulose (1000 second). Such cotton ordinarily contains approximately 30% solvent.

*Example 2.*—To illustrate the effect of the viscosity of the cotton on the viscosity of the final product a material which is substantially the same as that described in Example 1 may be prepared by dissolving 2/2.5 parts "wet" nitrocellulose (15 second) in 90/100 parts dibutyl phthalate.

*Example 3.*—A material having a viscosity at ordinary temperatures which approximates that of 600-W grease may be prepared by dissolving 4/6 parts of 100 second cotton in 90/100 parts of dibutyl phthalate.

*Example 4.*—A material having a viscosity approaching that of a thin cup grease may be made advantageously by dissolving 4/6 parts (1000 second) cotton in 90/100 parts of dibutyl phthalate.

*Example 5.*—To illustrate the manner of modifying the properties of the solution of the cotton in the cotton solvent one may employ a composition such as that formed by following the directions set forth in Examples 1 or 2. Upon heating 6.5 ounces of this composition to approximately 80° C. with 2 ounces of aluminum stearate and 12 ounces of toluol a clear jel is obtained of a consistency approximating vaseline.

*Example 6.*—The composition set forth in Example 5 may be modified by omitting the cellulose ester from the dibutyl phthalate. The viscosity of the resulting product so prepared may likewise be varied by changing the proportions of the constituents and have properties which make them well suited for hydraulically operated devices of the general class hereinabove set forth.

From the examples and general disclosure hereinabove set forth it will be apparent to those skilled in the art that the present invention affords a novel class of compositions of matter which are essentially insoluble in water, stable, non-drying, inert with respect to atmospheric conditions and of a viscosity which can be varied without otherwise changing the physical properties of the material. Although these compositions are essentially cellulose esters, such as— cellulose nitrate dissolved in a solvent therefor, which is substantially non-volatile under ordinary conditions, the invention comprehends materials having widely different properties so far as their viscosities are concerned and which may be modified by the addition of various modifying ingredients. Such modifying ingredients are well known to those skilled in the lubrication art.

Inasmuch as the preferred cellulose ester solvents are substantially non-volatile at ordinary temperatures the resulting products made therefrom do not evaporate or leave crusted films upon exposure over prolonged periods to atmospheric conditions.

What I claim is:

1. A liquid lubricant consisting of di-butyl phthalate to which a small amount of nitrocellulose has been added sufficient to adjust the viscosity to any desired value suitable for lubrication.

2. A liquid lubricant consisting of di-ethyl phthalate to which a small amount of nitrocellulose has been added sufficient to adjust the viscosity to any desired value suitable for lubrication.

3. A liquid lubricant consisting of an ester possessing a boiling point of substantially 300° C. to which a small amount of a cellulose ester has been added sufficient to adjust the viscosity to any desired value suitable for lubrication.

4. A liquid lubricant which consists of an ester which is substantially non-volatile at ordinary temperatures to which a small amount of a cellulose ester has been added sufficient to adjust the viscosity to any desired value suitable for lubrication.

5. A liquid lubricant which consists of a phthalate ester to which a small amount of a cellulose ester has been added sufficient to adjust the viscosity to any desired value suitable for lubrication.

6. A liquid lubricant which consists of a phthalate ester to which a small amount of a cellulose ester selected from the group consisting of cellulose nitrate and cellulose acetate has been added, the amount being sufficient to adjust the viscosity to any desired value suitable for lubrication.

7. A liquid lubricant which consists of an ester selected from the group which consists of aliphatic di-substituted phthalates and di-benzyl phthalate to which a small amount of cellulose nitrate has been added, the amount being sufficient to adjust the viscosity to any desired value suitable for lubrication.

8. A liquid lubricant which consists of an ester selected from the group which consists of di-butyl phthalate, di-ethyl phthalate, di-amyl phthalate, glycol phthalate, and di-benzyl phthalate, to which a small amount of cellulose nitrate has been added sufficient to adjust the viscosity to any desired value suitable for lubrication.

9. A liquid lubricant which consists of an ester in which the acid radical is selected from the group which consists of phthalates, malates, succinates and benzoates, the radical combined with the acid radical being selected from the group which consists of di-butyl, di-amyl, di-ethyl, glycol and di-benzyl for the di-basic acids, and butyl, amyl, ethyl, and benzyl for the mono-basic acids, to which a small amount of cellulose nitrate has been added, the amount being sufficient to adjust the viscosity to any desired value suitable for lubrication.

10. A liquid lubricant consisting of an ester in which the acid radical is selected from the group which consists of phthalates, malates, and succinates, and the radical combined with the acid radical is selected from the group which consists of di-butyl, di-ethyl, di-amyl, glycol, and di-benzyl, to which a small amount of cellulose nitrate has been added, the amount being sufficient to adjust the viscosity to any desired value suitable for lubrication.

11. A liquid lubricant consisting of an ester selected from the group which consists of di-butyl phthalate, di-ethyl phthalate, di-amyl phthalate, glycol phthalate, and di-benzyl phthalate, to which a small amount of cellulose nitrate has been added, the said amount being sufficient to adjust the viscosity to any desired value suitable for lubrication.

12. A liquid lubricant consisting of an ester selected from the group which consists of di-butyl phthalate, di-ethyl phthalate, di-amyl phthalate, glycol phthalate, and di-benzyl phthalate, to which a small amount of cellulose nitrate has been added, the said amount being sufficient to adjust the viscosity to any desired value suitable for lubrication, and a small amount of a material for rendering the resulting solution non-inflammable selected from the group which consists of phosphates and thio-phosphates.

WARREN A. CUSTER.